L. J. WAITE.
MOTOR CAR.
APPLICATION FILED MAR. 16, 1909.
1,123,042.
Patented Dec. 29, 1914.
2 SHEETS—SHEET 2.
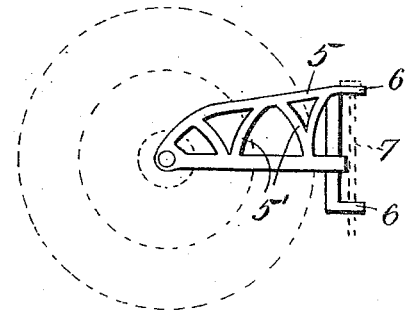
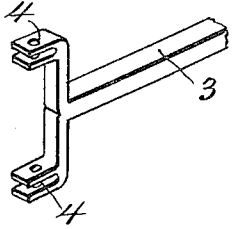
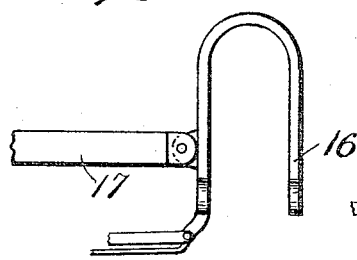
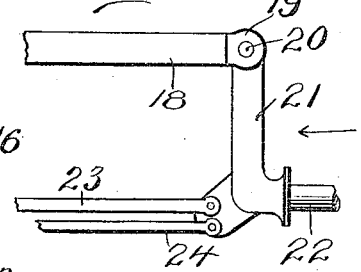
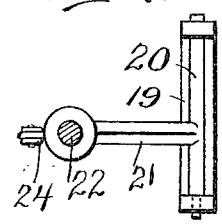
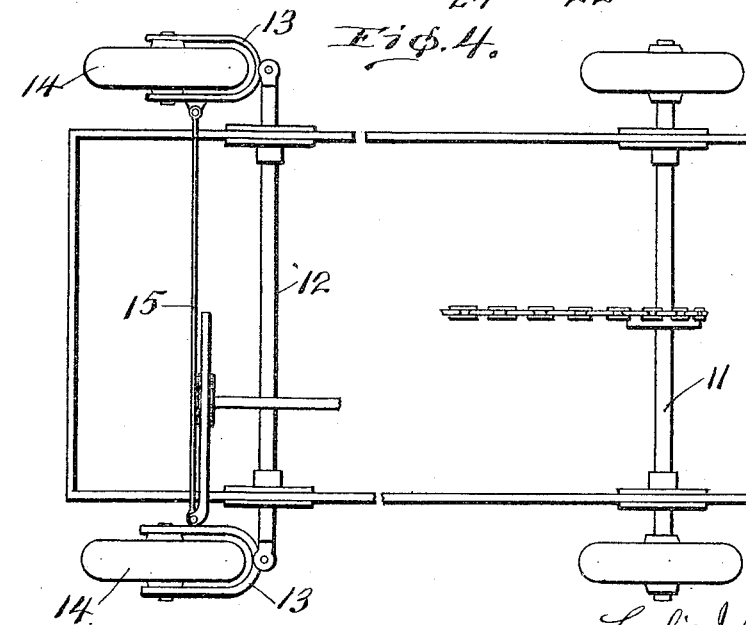

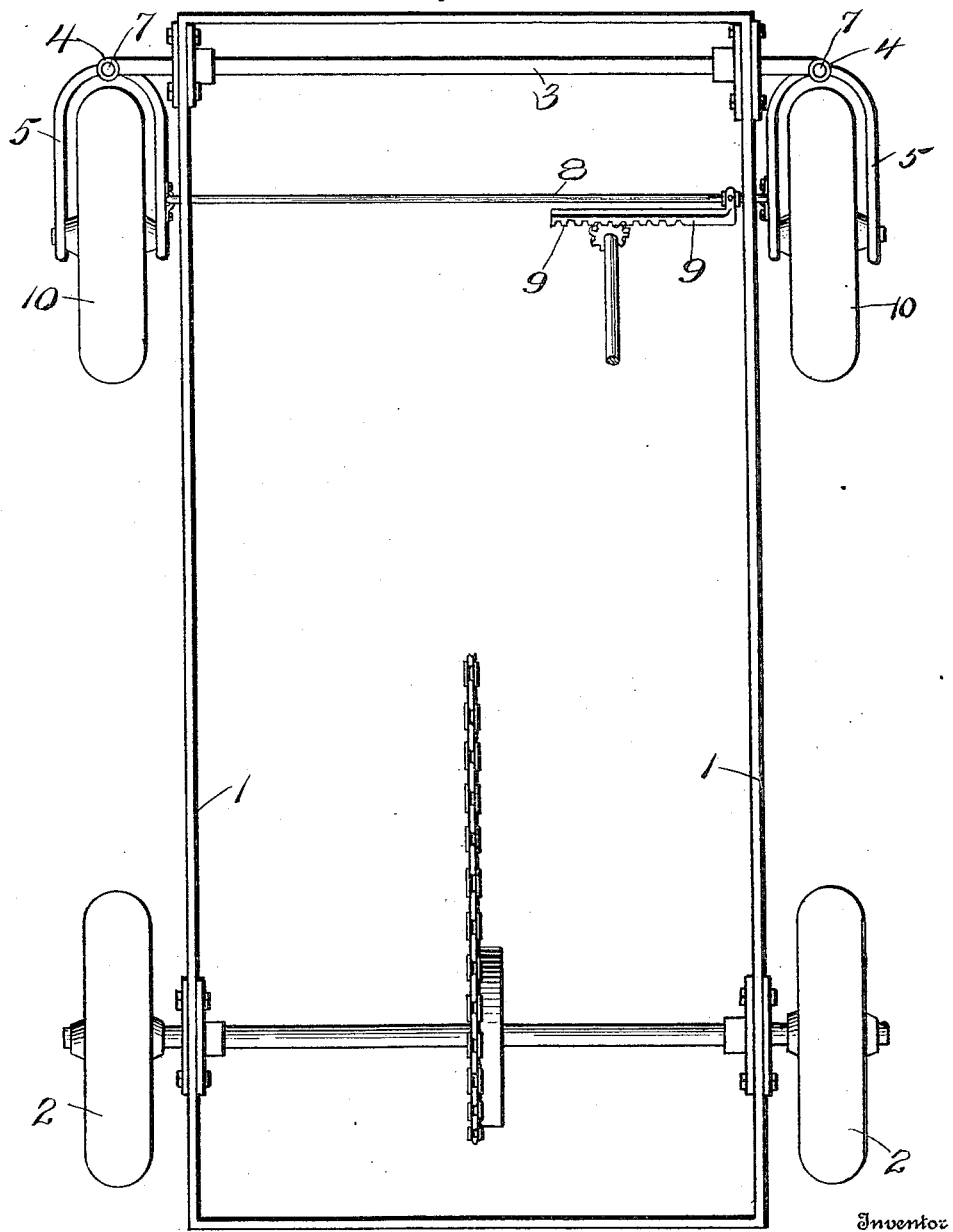

UNITED STATES PATENT OFFICE.

LESLIE J. WAITE, OF BINGHAMTON, NEW YORK.

MOTOR-CAR.

1,123,042.  Specification of Letters Patent.  Patented Dec. 29, 1914.

Application filed March 16, 1909. Serial No. 483,796.

*To all whom it may concern:*

Be it known that I, LESLIE J. WAITE, a citizen of the United States, residing at Binghamton, in the county of Broome and State of New York, have invented certain new and useful Improvements in Motor-Cars; and I do hereby declare the following to be a full, clear, and exact description of the invention, such as will enable others skilled in the art to which it appertains to make and use the same.

This invention relates to improvements in motor cars, and more particularly to mechanism adapted to cause the car, regardless of speed, and independently of the operator's control, to keep in a perfectly straight course, when left free by the operator, and to automatically return to a straight course after making a curve if the steering gear is released or left free by the operator, and the primary object in view is the production of a car capable of maintaining or automatically returning to a straight course without effort on the part of the operator.

A more detail object is the natural, free and ready tracking of the wheels of the car for causing the car to take a straight course if left uncontrolled.

With these and other objects in view, as will be hereinafter set forth in part and in part will become obvious, the invention comprises certain novel constructions, combinations and arrangements of parts as hereinafter disclosed and claimed.

In the accompanying drawing:—Figure 1 is a plan view of a car frame and connected parts illustrating an embodiment of the present invention. Fig. 2 is a view in side elevation of one of the forks detached, the wheel being seen in dots. Fig. 3 is a fragmentary view of one end of the axle. Fig. 4 is a similar view to Fig. 1 of a modified embodiment. Fig. 5 is a fragmentary view of a further embodiment. Fig. 6 is a similar view of another modification. Fig. 7 is a front view thereof.

Referring to the drawings by numerals, 1 indicates any ordinary motor car frame having the usual rear drive wheels 2 driven in any ordinary manner. The front of the frame is sustained by a front axle 3 rigidly connected to the frame and terminating at its ends in bifurcated bearings 4, 4. To each end of the axle 3 is pivotally connected a fork 5, preferably at the forward extreme of the fork, the forks being formed with bearing ears 6, 6 spaced to fit between the arms of the respective bifurcations 4. A pin 7 is passed through the inter-spaced parts 4 and 6 for pivotally connecting the same. Each fork 5 is preferably trussed, as at 5', for forming a relatively broad, vertical surface for increasing the strength of the bearing between the fork and axle.

Obviously, the forks 5 and axle 3 may be pivotally connected in various ways, and the above specified is merely mentioned for illustration, and not as a limitation to the invention.

Pivotally connected to the rear portion of each fork 5 and connecting the forks is the steering link 8, engaged by any ordinary steering rack 9 or other suitable steering device. Suitably journaled in the forks 5 in the rear of link 8 are the wheels 10, each wheel being rotatably mounted on a fixed axle carried by the respective fork, or fixed to a rotatable axle journaled in the fork, any common type of bearings and anti-friction devices being employed as found desirable.

In operation, when the steering gear is left free, the wheels 10 will trail and naturally and quickly return to a position in line with the general line of travel after having been moved therefrom. Thus if the car is started with no one at the wheel or other steering lever, the front and rear wheels will "track", that is maintain an alinement, and if the front wheels strike an obstacle and are momentarily thrown to one side they will immediately return to the tracking position when past the obstacle.

In Fig. 4, I have illustrated the same structure as above described, except that the front axle 11 is illustrated as the driving axle, and the rear axle 12 is pivotally connected to the forks 13, 13, inclosing and carried by wheels 14, 14. The usual steering link 15 connects forks 13, and is engaged by any suitable steering apparatus adapted for appropriate control. Obviously the operation will be the same as above described.

In Fig. 5, I have disclosed only one fork 16 which operates the same as above mentioned with respect to forks 5, except that the axle 17 is pivoted to the side of the fork, thus being positioned nearer the axis of movement of the wheel, the trailing or tracking being accomplished on the same principle as first specified.

In Figs. 6 and 7, I have illustrated a further embodiment in which the major portion of the fork is omitted, the axle 18 being pivotally connected by an elongated bearing 19 and journal and spindle 20 to a rearwardly extending, freely swinging bar 21, terminating in an outwardly extending axle 22, upon which the wheel is journaled. The steering link 23 connects the opposite bars 21, there of course being one for each front wheel or wheel under the steering control. Any ordinary steering rack 24 or other steering apparatus may engage one of bars 21 or link 23 for shifting the wheels on the vertical axis of pintle 20 for steering purposes. The trailing or tracking of the wheels will result in this structure after the manner above suggested.

What I claim is,—

1. In a vehicle, the combination with a frame and axles for supporting the same, of supporting wheels for one of said axles, forks pivotally engaging the other of said axles and extending longitudinally of the frame, wheels journaled in said forks, and means for swinging the forks upon their pivots for steering the last-mentioned wheels.

2. In a vehicle, the combination with a frame, of a supporting axle rigidly connected thereto, substantially U-shaped forks disposed horizontally and arranged one at each terminus of the axle, a pivotal connection between each fork and its respective terminal portion of the axle, the axis of each pivot being vertical and being disposed substantially at the crown of the respective fork, and means for shifting the forks for guiding the vehicle.

3. In a vehicle, the combination with a frame and a supporting axle rigidly connected thereto, of a member pivoted to each end portion of the axle to swing substantially horizontally, supporting wheels having journaled connections with said pivoted members, and means for shifting the pivoted members on their pivots for guiding said wheels, said means engaging the pivotal members between the pivot thereof and the journal connection with the respective wheels.

4. In a vehicle, the combination with a frame, of an axle rigidly connected thereto, a fork pivotally connected to each terminal portion of the axle and adapted to have journaled therein supporting wheels, and a steering link connected to both of the forks at points between the wheel journals and the pivots of the forks.

5. In a vehicle, the combination with a frame and an axle rigidly connected thereto, a member pivotally connected to each end of said axle and extending rearwardly therefrom and adapted to be swung laterally upon its pivot, a wheel journaled in the rear portion of each pivoted member, and a steering link extending across the frame and connected to both pivoted members between the pivot thereof and the journal for the respective wheel.

6. In a vehicle, the combination with a frame and an axle therefor, said axle having bifurcated end portions, the arms of each bifurcation being vertically alined and spaced apart, a fork for each bifurcation having a vertically disposed journal fixed at the crown of the fork and journaled in the arms of the respective bifurcation, the arms of each fork being formed of spaced bars connected by trussing, and the terminals of the arms of each fork being formed with bearings, and shifting means engaging each fork intermediate its ends.

In testimony whereof I affix my signature in presence of two witnesses.

LESLIE J. WAITE.

Witnesses:
KARL T. WRIGHT,
M. W. GAFFNEY.

Copies of this patent may be obtained for five cents each, by addressing the "Commissioner of Patents. Washington, D. C."